United States Patent
Sharifi et al.

(10) Patent No.: US 10,663,313 B2
(45) Date of Patent: May 26, 2020

(54) PROVIDING TRAFFIC WARNINGS TO A USER BASED ON RETURN JOURNEY

(71) Applicant: Google LLC, Mountain View, CA (US)

(72) Inventors: Matthew Sharifi, Kilchberg (CH); Jakob Foerster, Oxford (GB)

(73) Assignee: Google LLC, Mountain View, CA (US)

(*) Notice: Subject to any disclaimer, the term of this patent is extended or adjusted under 35 U.S.C. 154(b) by 137 days.

(21) Appl. No.: 15/844,006

(22) Filed: Dec. 15, 2017

(65) Prior Publication Data

US 2019/0186937 A1  Jun. 20, 2019

(51) Int. Cl.
*G01C 21/34* (2006.01)
*G01C 21/36* (2006.01)

(52) U.S. Cl.
CPC ..... *G01C 21/3492* (2013.01); *G01C 21/3484* (2013.01); *G01C 21/3691* (2013.01)

(58) Field of Classification Search
CPC .................................................. G01C 21/3492
See application file for complete search history.

(56) References Cited

U.S. PATENT DOCUMENTS

| | | | | |
|---|---|---|---|---|
| 8,612,140 | B2* | 12/2013 | Gutman | G01C 21/3469 701/410 |
| 8,965,972 | B2* | 2/2015 | Faulbacher | G06Q 10/10 709/204 |
| 8,972,169 | B2* | 3/2015 | Gutman | G01C 21/3469 701/410 |
| 9,377,319 | B2 | 6/2016 | San Filippo et al. | |
| 9,389,088 | B2* | 7/2016 | Kalai | G01C 21/32 |
| 9,401,088 | B2 | 7/2016 | Gueziec | |
| 9,869,562 | B2* | 1/2018 | Chin | G01C 21/343 |
| 10,260,896 | B2* | 4/2019 | Singh | G01C 21/3484 |
| 2003/0028320 | A1* | 2/2003 | Niitsuma | G01C 21/3415 701/411 |

(Continued)

FOREIGN PATENT DOCUMENTS

| | | |
|---|---|---|
| JP | 4048963 | 2/2008 |
| JP | 4448501 | 4/2010 |

OTHER PUBLICATIONS

International Search Report and Written Opinion for PCT/US2018050666, dated Dec. 4, 2018, 30 pages.

*Primary Examiner* — Bao Long T Nguyen
*Assistant Examiner* — Michael A Berns
(74) *Attorney, Agent, or Firm* — Dority & Manning, P.A.

(57) ABSTRACT

Systems and methods for generating return journey notifications include obtaining a request for navigational directions to a target destination. An outbound journey route from an initial location to the target destination can be determined, wherein the outbound journey route includes an estimated outbound journey time. A return journey route from the target destination to a return destination can be determined, wherein the return journey route includes an estimated return journey time. The outbound journey route and/or return journey route can be determined at least in part from one or more of current traffic conditions or historical traffic conditions. One or more notifications regarding the return journey route can be generated when comparing the estimated outbound journey time to the estimated return journey time results in a determination that one or more predetermined criteria are met.

20 Claims, 5 Drawing Sheets

(56) References Cited

U.S. PATENT DOCUMENTS

2014/0278056 A1\* 9/2014 Williams ........... G01C 21/3476
701/410
2015/0269150 A1 9/2015 Carper et al.

\* cited by examiner

PROVIDING TRAFFIC WARNINGS TO A USER BASED ON RETURN JOURNEY

FIELD

The present disclosure relates generally to navigation systems. More particularly, the present disclosure relates to generating route information that accounts for aspects of a return journey route.

BACKGROUND

Various navigation systems provide users with turn-by-turn directions. These systems can include handheld GPS devices or mobile phones, vehicle-mounted devices, or Internet-based computers with access to a mapping application. Users input one or more locations and receive a route and turn-by-turn directions. Generally, these systems can select a fastest route based on the shortest estimated time to travel along the route. Some systems can incorporate traffic conditions, for example reports of congestion, into this calculation. Some systems can provide route information including an estimated travel time to the one or more locations.

A user can evaluate the information provided by a navigation system and/or mapping application for planning purposes. For example, route information that includes an estimated travel time to a destination location can help a user plan a departure time. More particularly, a user can select a local grocery store as a destination location to see the estimated travel time to the grocery store with live traffic information taken into account. In some instances, a user might make decisions about a desired destination based on this navigational information.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by one or more computing devices, a request for navigational directions to a target destination. The method also includes determining, by the one or more computing devices, an outbound journey route from an initial location to the target destination, wherein the outbound journey route includes an estimated outbound journey time. The method also includes determining, by the one or more computing devices, a return journey route from the target destination to a return destination, wherein the return journey route includes an estimated return journey time. The method also includes comparing, by the one or more computing devices, the estimated outbound journey time to the estimated return journey time. The method also includes generating, by the one or more computing devices, a notification regarding the return journey route when comparing the estimated outbound journey time to the estimated return journey time results in a determination that one or more predetermined criteria are met.

Another example aspect of the present disclosure is directed to a user computing device. The user computing device includes a display device, one or more processors, and at least one tangible, non-transitory computer-readable medium that stores instructions that, when executed by the one or more processors, cause the user computing device to perform operations. The operations include receiving a request for navigational directions to a target destination. The operations also include initiating determination of an estimated outbound journey time to travel from an initial location to the target destination and an estimated return journey time to travel from the target destination to a return destination. The estimated outbound journey time and the estimated return journey time are determined at least in part from one or more of current traffic conditions or historical traffic conditions. The operations also include receiving a notification regarding the return journey time when a comparison of the estimated outbound journey time to the estimated return journey time results in a determination that one or more predetermined criteria are met. The operations also include providing the notification for display on the display device.

Another example aspect of the present disclosure is directed to one or more tangible, non-transitory computer-readable media storing computer executable instructions that when executed by one or more processors cause the one or more processors to perform operations. The operations include obtaining a request for navigational directions to a target destination. The operations include determining an outbound journey route from an initial location to the target destination, wherein the outbound journey route includes an estimated outbound journey time. Determining the outbound journey route is based at least in part on one or more of current traffic conditions or historical traffic conditions. The operations also include determining an estimated destination time indicative of an estimated amount of time a user will spend at the target destination. The operations also include determining a return journey route from the target destination to a return destination, wherein the return journey route includes an estimated return journey time that is determined at least in part from one or more of current traffic conditions or historical traffic conditions for a return start time determined from the estimated outbound journey time and the estimated destination time. The operations also include comparing the estimated outbound journey time to the estimated return journey time. The operations also include generating a notification regarding the return journey route when comparing the estimated outbound journey time to the estimated return journey time results in a determination that one or more predetermined criteria are met.

Other aspects of the present disclosure are directed to various systems, apparatuses, computer program products, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Generally, the present disclosure is directed to systems and methods for generating route information that accounts for aspects of both an outbound journey and a return journey. For example, an outbound journey route from an initial location to a target destination can be determined and can include an estimated outbound journey time. A return destination route from the target destination to a return destination can also be determined and can include an estimated return journey time. The return destination may be the initial location, or may be a different location ("return" is used in the sense that the outbound journey is to the target destination, and the return journey is away from the target destination). Based on a comparison of the outbound journey time to the return journey time, one or more notifications can be provided to a mapping application user. Return journey notifications can include, for example, estimated return journey times, estimated differences between outbound and return journey times, warnings for predetermined route factors, and the like. By providing return journey notifications associated with the time it would take a user to return back to their starting point or another return destination, such users are provided with more comprehensive and valuable trip planning information. This can be especially useful when the estimated time for a return journey is significantly different than the estimated time for an outbound journey, as might be caused when traffic is completely different on each side of a route. Such information can be very useful to a user at the time of departure so that more well-informed decisions about local travel can be made.

More particularly, in some implementations, a user computing device (e.g., a mobile computing device such as a smartphone or other mobile device, a navigation system, a laptop, a tablet, or the like) can include at least one processor and at least one tangible, non-transitory computer-readable medium that stores instructions that, when executed by the at least one processor, cause the user computing device to perform operations. The user computing device can also include a communications interface, a display device, a user input device, a geographic position component, and an accelerometer. The user computing device can also include or otherwise obtain access to (e.g., via a server computing device) a mapping application.

In some implementations, the communications interface of the user computing device can be configured to establish wireless communication over a network with one or more remote computing devices (e.g., one or more server computing devices). In some implementations, the user computing device and remote computing device(s) that are communicatively coupled via a network respectively include a mapping platform that enables map content and navigational information to be shared from one device to another via the network. The communications interface can include any suitable hardware and/or software components for interfacing with one or more networks, including for example, transmitters, receivers, ports, controllers, antennas, or other suitable components. The network can be any type of communications network, such as a local area network (e.g., intranet), wide area network (e.g., Internet), or some combination thereof and can include any number of wired or wireless links. In general, communication over the network can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the display device of the user computing device can be configured to provide various user interfaces for display to a user of the user computing device. For example, maps associated with the mapping application can be provided for display via the display device. The mapping application can generate additional data that can be provided for display via the display device, including but not limited to outbound journey routes and/or return journey routes along various road segments within a map, outbound journey distances, outbound journey times, return journey distances, return journey times, destination times, return journey notifications, contextual information regarding trip calculations, etc.

In some implementations, the user input device of the user computing device can be configured to receive instructions from a user. For example, the user input device can be a touchscreen associated with the display device, a keyboard, an eye tracking device, a mouse, a joystick, a remote control, or any other device capable of providing input to the user computing device. In some implementations, the user input device is configured to receive instructions indicative of a target destination associated with a request for navigational directions. In some implementations, the user input device is configured to receive instructions indicative of an initial location associated with a request for navigational directions. In some implementations, the user input device is configured to receive instructions indicative of a return destination associated with a request for navigational directions. In some implementations, the user input device is configured to receive instructions modifying at least one trip parameter associated with a request for navigational directions.

In some implementations, the geographic position component can include hardware and/or software configured to determine the geographic location and orientation of the user computing device. For example, geographic position component can include a GPS receiver to determine the user computing device's latitude, longitude and altitude position. In another example, the geographic position component can also include software for determining the position of the device based on other signals received at the user computing device, such as signals received at a cell phone's antenna from one or more cell phone towers if the client device is a cell phone. In still another example, the geographic position component can detect all WiFi networks in the vicinity, measure the strength of the signal from those networks, and use a table of Wi-Fi access point locations to triangulate the geographic position of the user computing device. It will be understood that any number of geographic positioning systems, alone or in combination, can be used.

In some implementations, the accelerometer (or other alternative device such as a gyroscope or the like) of the user computing device can include hardware and/or software configured to determine the direction in which the user computing device is oriented. By way of example only, the device can determine its pitch, yaw or roll (or changes thereto) relative to the direction of gravity or a plane perpendicular thereto. In that regard, it will be understood that provision of location and orientation data as set forth herein can be provided automatically to a user computing device, to a server computing device, or both.

According to an aspect of the present disclosure, the mapping application can include one or more of an outbound journey route generator, a return destination predictor, a return journey route generator, a trip time analyzer, and/or a return journey notification generator. The mapping application and various components thereof can include computer logic utilized to provide desired functionality. The mapping application can be implemented in hardware, firmware, and/or software controlling a general purpose processor. For example, in some implementations, the mapping application can include program files stored on a storage device, loaded into a memory and executed by one or more processors. In other implementations, the mapping application includes one or more sets of computer program products and/or computer-executable instructions that are stored in a tangible computer-readable storage medium such as RAM hard disk or optical or magnetic media.

The disclosure further provides a computer program product comprising computer-executable instructions for implementing the mapping application. The computer program product may be stored in a tangible computer-readable storage medium such as RAM hard disk or optical or magnetic media; or alternatively it may be downloadable over a communications network as a signal without necessarily being stored in a tangible computer-readable storage medium.

In a further aspect of the present disclosure there is provided a computer program product (whether stored on a computer-readable storage medium or otherwise) in the form of instructions which are executable by a processor of a user device to interact with a mapping application which is running on a separate computer, e.g. a remote server. For example, the instructions may be implemented to generate a user interface for receiving, and relaying to the separate computer, the instructions which are used by the mapping application, and/or for presenting to the user the notifications generated by the separate computer.

More particularly, the outbound journey route generator can be configured to determine an outbound journey route from an initial location to a target destination. In some implementations, the target destination is identified from instructions received from a user of the user computing device, for example, as part of a request for navigational directions to a particular location. In some implementations, the initial location is also identified from instructions received from a user of the user computing device. In other implementations, the initial location is determined to correspond to a current location of the user computing device as determined, for example, by the geographic position component within the user computing device. Instructions identifying a target destination, an initial location, etc. can be provided in any number of forms including street addresses, points of interest, GPS coordinates or the like.

In some implementations, the outbound journey route generator can determine a plurality of candidate outbound journey routes between the initial location and the target destination. Each candidate outbound journey route can include one or more route segments. For each route segment of a candidate outbound journey route, an estimated drive time for the route can be calculated based on expected traffic conditions (e.g., current traffic conditions and/or historical traffic conditions as determined relative to an outbound start time). For example, the outbound route generation process can begin by estimating that a user will leave a current/initial location for a target destination immediately (or at some other specified outbound start time). Thus, the user would be moving along a given outbound journey route segment at the present time. The outbound journey route generator can determine from time period information associated with the given outbound journey route segment the estimated number of vehicles that are located or are expected to be located along the given outbound journey route segment at the present time. Using the estimated number of vehicles and a capacity index, the outbound journey route generator can determine an approximate time of travel along the given outbound journey route segment.

The outbound journey route generator can determine the approximate time of travel along the next outbound journey route segment based on the approximate time of travel of the previous outbound journey route segment. For example, if a determination is made that it will take approximately two (2) minutes to move along a first outbound journey route segment and get to a second outbound journey route segment, the outbound journey route generator will determine from the time period information associated with the first outbound journey route segment, the estimated number of vehicles that will be located along the second outbound journey route segment at two (2) minutes from the present time. Using the estimated number of vehicles and the capacity index, the outbound journey route generator can determine an approximate time of travel along the second outbound journey route segment. The outbound journey route generator can repeat this process for subsequent outbound journey route segments until arrival at the target destination.

Once the outbound journey route generator has determined the estimated travel time for each route segment of an outbound journey route, the outbound journey route generator can determine an estimated outbound journey time for the entire outbound journey route by determining the sum of the estimated travel times for each of the outbound journey route segments. In some implementations, the outbound journey route generator can select a fastest route by comparing the estimated outbound journey times of a plurality of candidate routes. In some implementations, the outbound journey route generator can also generate turn-by-turn directions based on the determined outbound journey route and provide such directions for display to the user computing device.

According to another aspect of the present disclosure, the return destination predictor can be configured to determine a return destination to which a user is predicted to return after traveling to the target destination. In some implementations, the return destination can be predicted to correspond to the initial location for which an outbound journey route is generated. In some implementations, the return destination can be based on a current location associated with a user computing device from which the request for navigational directions is received. In some implementations, the return destination can be determined based on input received from a user computing device from which the request for navigational directions is received. For example, a user can specify a particular return destination via a user interface provided within the mapping application.

In some implementations, the return destination predictor can determine a return destination based on a history of locations visited by a user computing device from which the request for navigational directions is received. For example, user location history can indicate one or more common journey patterns that can help determine a predicted return destination. For instance, a common journey pattern can indicate that when a user leaves a first location (e.g., work) at a particular time of day (e.g., near close of business time) to travel to a second location corresponding to a target destination (e.g., the grocery store), the return destination typically corresponds to a third location (e.g., home). Alternatively, a common journey pattern can indicate that when a user leaves a first location (e.g., home) at a particular time of day (e.g., near start of school time) to travel to a second location corresponding to a target destination (e.g., a child's school), the return destination typically corresponds to the first location (e.g., home).

In some implementations, the return destination predictor can determine a return destination based on a category associated with the target destination. For example, when a user requests navigational directions to a particular point of interest such as "Café ABC," the return destination predictor can determine a category of "restaurant" associated with the "Café ABC" target destination. This category associated with the target destination can be used in analyzing user location history to identify common journey patterns that can help identify a return destination. For example, if user location history indicates that a user often travels from an initial location (e.g., "work") at a particular time of day (e.g., lunchtime) to one or more various target destinations associated with a particular category (e.g., a variety of restaurants), and a user requests navigational directions around lunchtime to Café XYZ, then a return destination of "work" can be predicted.

Once a return destination is specified by a user or otherwise determined by the return destination predictor, a return journey route can be generated by return journey route generator.

More particularly, the return journey route generator can be configured to determine a return journey route from the target destination to the return destination. In some implementations, when the return destination is the same as an initial location, the return journey route can follow some or all of the same road segments as the outbound journey route. However, since traffic heading in one direction along a road segment versus another direction (e.g., an opposite direction) occurs in different lanes along such road segments, the traffic conditions and corresponding travel times associated with a return journey route can be different than an outbound journey route on the same road segment(s). In some implementations, the return journey route follows some of all of a different set of road segments than the outbound journey route. This can happen, for example, when a return destination is different than the initial location. Even when the return destination is the same as the initial location, different road segments can be traversed when lane patterns, traffic conditions, or other factors result in a different return journey route being faster than a return journey route corresponding to the outbound journey route.

In some implementations, the return journey route generator can determine a plurality of candidate return journey routes between the target destination and the return destination. Each candidate return journey route can include one or more route segments. For each route segment of a candidate return journey route, an estimated drive time for the route can be calculated based on expected traffic conditions (e.g., current traffic conditions and/or historical traffic conditions as determined relative to a return start time). A return start time can be determined as a sum of the estimated outbound journey time plus an estimated destination time. The estimated destination time can correspond to an amount of time a user is predicted to spend at the target destination. In some implementations, the estimated destination time can be determined based on historical data indicative of an average amount of time multiple users spend at the target destination. For example, if the average user spends 20 minutes shopping in Store ABC during a particular day and timeframe, then the destination time can be estimated at 20 minutes. Additionally or alternatively, the estimated destination time can be determined based on historical data indicative of an average amount of time the user spends at the target destination. For example, if the average user spends 10 minutes at his child's school for pickup on a particular day of the week and timeframe, then the destination time can be estimated at 10 minutes.

More particularly, the return journey route generation process can begin by determining that a user will leave the target destination at a return start time equal to the sum of the estimated outbound journey time plus the estimated destination time. The return journey route generator can determine from time period information associated with the given return journey route segment the estimated number of vehicles that are located or expected to be located along the given return journey route segment at the return start time. Using the estimated number of vehicles and a capacity index, the return journey route generator can determine an approximate time of travel along the given return journey route segment.

The return journey route generator can determine the approximate time of travel along the next return journey route segment based on the approximate time of travel of the previous return journey route segment. For example, if a determination is made that it will take approximately two (2) minutes to move along a first return journey route segment and get to a second return journey route segment, the return journey route generator will determine from the time period information associated with the first return journey route segment, the estimated number of vehicles that will be located along the second return journey route segment at two (2) minutes from the return start time. Using the estimated number of vehicles and the capacity index, the return journey route generator can determine an approximate time of travel along the second return journey route segment. The return journey route generator can repeat this process for subsequent route segments until arrival at the return destination.

Once the return journey route generator has determined the estimated travel time for each route segment of a return journey route, the return journey route generator can determine an estimated return journey time for the entire return journey route by determining the sum of the estimated travel times for each of the return journey route segments. In some implementations, the return journey route generator can select a fastest route by comparing the estimated return journey times of a plurality of candidate routes. In some implementations, the return journey route generator can also generate turn-by-turn directions based on the determined return journey route and provide such directions for display to the user computing device.

According to another aspect of the present disclosure, the trip time analyzer can be configured to compare the estimated outbound journey time to the estimated return journey time. In some implementations, the trip time analyzer can determine when the comparison of the estimated outbound journey time to the estimated return journey time results in a determination that one or more predetermined criteria are met. For example, one of the predetermined criteria can correspond to the estimated return journey time being greater than the estimated outbound journey time. In another example, one of the predetermined criteria can correspond to the estimated return journey time being greater than the estimated outbound journey time plus some predetermined threshold value (e.g., a certain predetermined increment of time or a predetermined percentage of the estimated outbound journey time). In another example, one of the predetermined criteria can correspond to the estimated return journey time being greater than an expected typical trip time.

Aspects of the trip time analyzer can be coupled with aspects of the return journey notification generator such that return journey notifications can be generated and ultimately provided for display on a user computing device when various criteria are met as determined by the trip time analyzer. For example, a return journey notification can be generated and/or provided (e.g., from a server computing device to the user computing device) when comparing the estimated outbound journey time to the estimated return journey time results in a determination that one or more predetermined criteria are met as evaluated by the trip time analyzer.

In some implementations, a notification provided by the return journey notification generator can correspond to a warning icon provided on a user interface. In some implementations, a notification provided by the return journey notification generator can correspond to an identification of the estimated return journey time. In some implementations, a notification provided by the return journey notification generator can correspond to a time difference between the estimated outbound journey time and the estimated return journey time. In some implementations, a notification provided by the return journey notification generator can correspond to a warning regarding expected traffic on the return journey route. It should be appreciated that other forms of warnings and/or textual advice can be provided via the return journey notification generator (e.g., "Leave now to avoid traffic on the return journey.")

In some implementations, a notification provided via the return journey notification generator can correspond to a contextual explanation of how one or more of the estimated outbound journey time, the predicted return destination, the estimated destination time, and/or the estimated return journey time is determined. These contextual explanations can also be coupled with user interface features by which a user can change certain estimated assumptions to improve the accuracy of predicted aspects associated with a return journey route. More particularly, user interface features can be provided to receive instructions modifying at least one trip parameter (e.g., a predicted return destination, an estimated destination time, etc.).

In some implementations, a notification provided via the return journey notification generator can include an alternate target destination than the target destination initially associated with a request for navigational directions. For example, if an alternate target destination (e.g., a second grocery store) has an estimated alternate outbound journey time and estimated alternate return journey time that is less than the estimated outbound journey time and the estimated return journey time associated with travel to a first grocery store, then a return journey notification can include a suggestion to select the alternate target destination. Alternate target destinations can be provided for display on a map or other user interface along with information including an estimated outbound journey time and estimated return journey time for the alternate target destination. In some implementations, alternate target destinations can be determined at least in part based on user location history. By determining an alternate target destination that a given user has actually visited before, the mapping application can enhance the likelihood of determining desirable alternate target destinations for each user.

The systems and methods described herein can provide a number of technical effects and benefits. For instance, the disclosed techniques can advantageously solve a problem regarding comprehensiveness of travel information provided by a navigation system. In addition to providing travel information associated with an outbound journey, the disclosed techniques can also provide travel information associated with a return journey. As such, a mapping application can generate more comprehensive navigational information that analyzes beyond what a user is going to do once they reach a target destination to include a user's time spent at a target destination as well as a user's return to his initial location or a next destination. By providing return journey notifications associated with the time it would take a user to return back to a starting point or another return destination, users are provided with more comprehensive and valuable trip planning information. This can be especially useful when the estimated time for a return journey is significantly different than the estimated time for an outbound journey, as might be caused when traffic is completely different on each side of a route. Such information can be very useful to a user at the time of departure so they can make more well-informed decisions about local travel.

Another example technical effect and benefit of the present disclosure lies in an ability of the disclosed systems and methods to determine when it is appropriate or otherwise desired to generate the above-described travel information associated with a return journey. It may not be appropriate to always generate return journey travel information, such as when the destination time a user expects to be at a target destination exceeds a threshold period of time (e.g., several hours or several days). As such, in some implementations, the disclosed technology provides features for determining a category associated with a target destination, for determining an estimated destination time and/or determining a predicted return destination. Generating return journey notifications can be determined based on one or more of the category associated with the target destination, the estimated destination time, the predicted return destination and/or the estimated return journey time. Features can also be provided for determining when it is appropriate or otherwise desired to determine an alternate target destination, outbound journey route, and/or return journey route when travel times associated with an original target destination are longer than normal.

A still further technical effect and benefit of the present disclosure is the customizable nature of possible notifications available to a user to improve the overall comprehensiveness and effectiveness of navigational directions provided to users of a mapping application. More particularly, numerous different types of user interfaces and associated notifications can be provided for display to a mapping application user. For example, in some implementations, maps can be provided that depict both an outbound journey route and a return journey route. In some implementations, notifications can include an identification of the estimated return journey time, a time difference between the estimated outbound journey time and the estimated return journey time, and/or a warning regarding expected traffic on the return journey route. Still further, notifications can include a contextual explanation of how one or more of an estimated outbound journey time, an estimated destination time, or an estimated return journey time is determined. User interface features can be provided by which a user can change one or more of the data variables associated with the contextual explanation and assumptions regarding calculation of the various trip times. As such, trip time estimations and return journey notifications can be further customized and improved by a mapping application user.

With reference now to the Figures, example embodiments of the present disclosure will be discussed in further detail.

Figure 1:
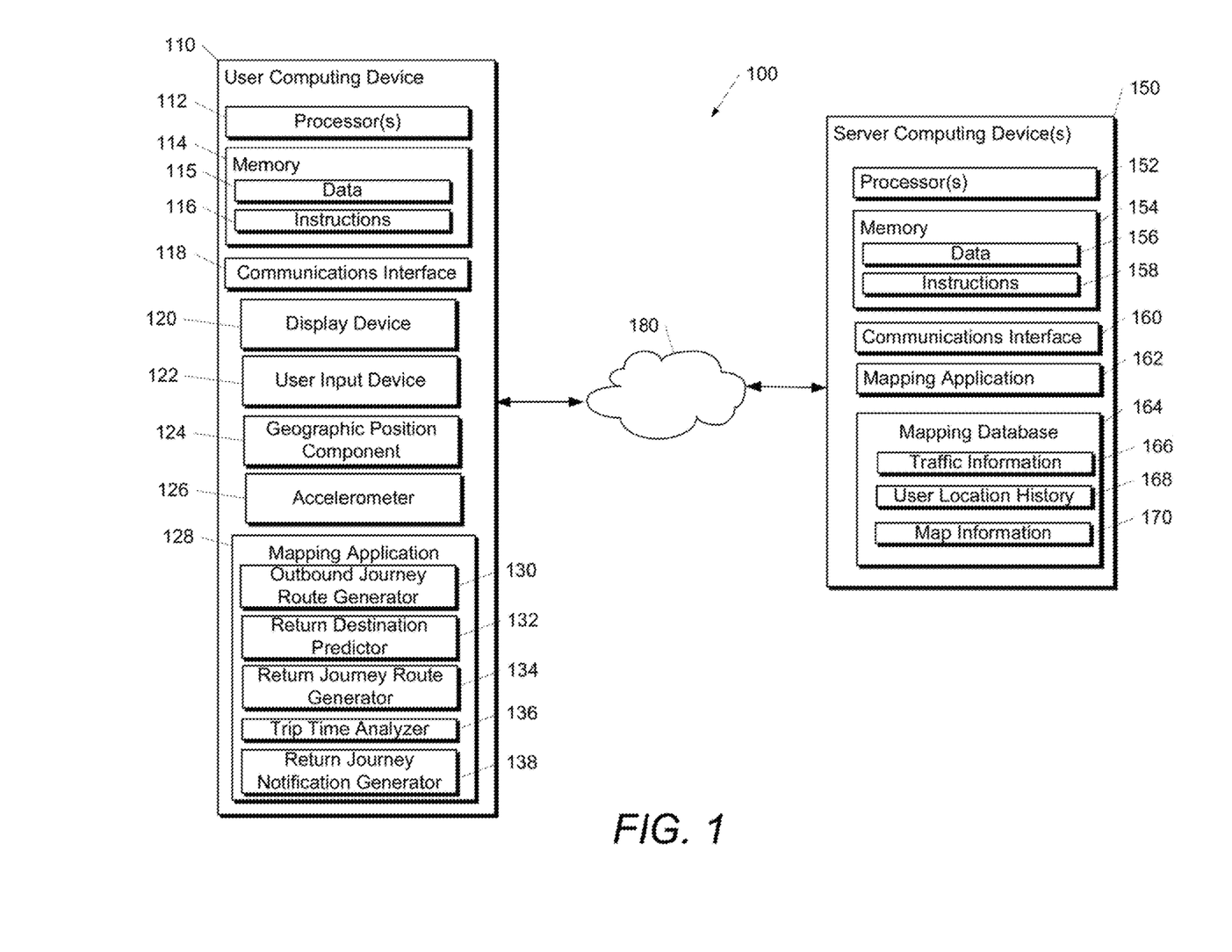
FIG. 1 depicts a block diagram of an example computing system according to example embodiments of the present disclosure.

FIG. 1 depicts a block diagram of an example system 100 including a user computing device 110 (e.g., a mobile computing device such as a smartphone or other mobile device, a navigation system, a laptop, a tablet, or the like). User computing device 100 can include one or more processors 112 and at least one memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data and instructions which are executed by the processor(s) 112 to cause the user computing device 110 to perform operations. The user computing device 110 can also include a communications interface 118 that enables communications over one or more networks (e.g., network 180), as well as a display device 120, a user input device 122, a geographic position component 124, and an accelerometer 126. The user computing device 110 can also include or otherwise obtain access to (e.g., via a server computing device 150) a mapping application 128.

In some implementations, the communications interface 118 of the user computing device 110 can be configured to establish wireless communication over network 180 with one or more remote computing devices (e.g., one or more server computing devices 150). In some implementations, the user computing device 110 and server computing device(s) 150 that are communicatively coupled via network 180 respectively include a mapping platform that enables map content and navigational information to be shared from one device to another via the network 180. The communications interface 118 can include any suitable hardware and/or software components for interfacing with one or more networks, including for example, transmitters, receivers, ports, controllers, antennas, or other suitable components.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the display device 120 of the user computing device 110 can be configured to provide various user interfaces for display to a user of the user computing device 110. For example, maps associated with the mapping application 128 can be provided for display via the display device 120. The mapping application 128 can generate additional data that can be provided for display via the display device 120, including but not limited to outbound journey routes and/or return journey routes along various road segments within a map, outbound journey distances, outbound journey times, return journey distances, return journey times, destination times, return journey notifications, contextual information regarding trip calculations, etc.

In some implementations, the user input device 122 of the user computing device 110 can be configured to receive instructions from a user. For example, the user input device 122 can be a touchscreen associated with the display device 120, a keyboard, an eye tracking device, a mouse, a joystick, a remote control, or any other device capable of providing input to the user computing device 110. In some implementations, the user input device 122 is configured to receive instructions indicative of a target destination associated with a request for navigational directions. In some implementations, the user input device 122 is configured to receive instructions indicative of an initial location associated with a request for navigational directions. In some implementations, the user input device 122 is configured to receive instructions indicative of a return destination associated with a request for navigational directions. In some implementations, the user input device 122 is configured to receive instructions modifying at least one trip parameter associated with a request for navigational directions.

In some implementations, the geographic position component 124 can include hardware and/or software configured to determine the geographic location and orientation of the user computing device 110. For example, geographic position component 124 can include a GPS receiver to determine the latitude, longitude and altitude position of user computing device 110. In another example, the geographic position component 124 can also include software for determining the position of the user computing device 110 based on other signals received at the user computing device 110, such as signals received at a cell phone's antenna from one or more cell phone towers if the user computing device 110 is a cell phone. In still another example, the geographic position component 124 can detect all Wi-Fi networks in the vicinity, measure the strength of the signal from those networks, and use a table of Wi-Fi access point locations to triangulate the geographic position of the user computing device. It will be understood that any number of geographic positioning systems, alone or in combination, can be used.

In some implementations, the accelerometer 126 (or other alternative device such as a gyroscope or the like) of the user computing device 110 can include hardware and/or software configured to determine the direction in which the user computing device 110 is oriented. By way of example only, the device can determine its pitch, yaw or roll (or changes thereto) relative to the direction of gravity or a plane perpendicular thereto. In that regard, it will be understood that provision of location and orientation data as set forth herein can be provided automatically to a user computing device 110, to a server computing device 150, or both.

According to an aspect of the present disclosure, the mapping application 128 can include one or more of an outbound journey route generator 130, a return destination predictor 132, a return journey route generator 134, a trip time analyzer 136, and/or a return journey notification generator 138. The mapping application 128 and various components thereof can include computer logic utilized to provide desired functionality. The mapping application 128 can be implemented in hardware, firmware, and/or software controlling a general purpose processor. For example, in some implementations, the mapping application 128 can include program files stored on a storage device, loaded into a memory and executed by one or more processors. In other implementations, the mapping application 128 includes one or more sets of computer-executable instructions that are stored in a tangible computer-readable storage medium such as RAM hard disk or optical or magnetic media.

More particularly, the outbound journey route generator 130 can be configured to determine an outbound journey route from an initial location to a target destination. In some implementations, the target destination is identified from instructions received from a user of the user computing device 110, for example, as part of a request for navigational directions to a particular location. In some implementations, the initial location is also identified from instructions received from a user of the user computing device 110. In other implementations, the initial location is determined to correspond to a current location of the user computing device 110 as determined, for example, by the geographic position component 124 within the user computing device 110. Instructions identifying a target destination, an initial location, etc. can be provided in any number of forms including street addresses, points of interest, GPS coordinates or the like.

In some implementations, the outbound journey route generator 130 can determine a plurality of candidate outbound journey routes between the initial location and the target destination. Each candidate outbound journey route can include one or more route segments. For each route segment of a candidate outbound journey route, an estimated drive time for the route can be calculated based on expected traffic conditions (e.g., current traffic conditions and/or historical traffic conditions as determined relative to an outbound start time). In some implementations, traffic conditions can be determined from traffic information 166 provided as part of a mapping database 164.

For example, the outbound route generation process can begin by estimating that a user will leave a current/initial location for a target destination immediately (or at some other specified outbound start time). Thus, the user would be moving along a given outbound journey route segment at the present time. The outbound journey route generator can determine from time period information associated with the given outbound journey route segment the estimated number of vehicles that are located or are expected to be located along the given outbound journey route segment at the present time. Using the estimated number of vehicles and a capacity index, the outbound journey route generator 130 can determine an approximate time of travel along the given outbound journey route segment.

The outbound journey route generator 130 can determine the approximate time of travel along the next outbound journey route segment based on the approximate time of travel of the previous outbound journey route segment. For example, if a determination is made that it will take approximately two (2) minutes to move along a first outbound journey route segment and get to a second outbound journey route segment, the outbound journey route generator 130 will determine from the time period information associated with the first outbound journey route segment, the estimated number of vehicles that will be located along the second outbound journey route segment at two (2) minutes from the present time. Using the estimated number of vehicles and the capacity index, the outbound journey route generator 130 can determine an approximate time of travel along the second outbound journey route segment. The outbound journey route generator 130 can repeat this process for subsequent outbound journey route segments until arrival at the target destination.

Once the outbound journey route generator 130 has determined the estimated travel time for each route segment of an outbound journey route, the outbound journey route generator 130 can determine an estimated outbound journey time for the entire outbound journey route by determining the sum of the estimated travel times for each of the outbound journey route segments. In some implementations, the outbound journey route generator 130 can select a fastest route by comparing the estimated outbound journey times of a plurality of candidate routes. In some implementations, the outbound journey route generator 130 can also generate turn-by-turn directions based on the determined outbound journey route and provide such directions for display to the user computing device 110 (e.g., via display device 120).

According to another aspect of the present disclosure, mapping application 118 can include features for determining when it is appropriate or otherwise desired to generate return journey information associated with an outbound journey route determined by outbound journey route generator 130. It may not always be appropriate to generate return journey travel information. This may be the case for certain categories of target destinations (e.g., a target destination corresponds to an airport where a user plans to park for a trip) and/or when the destination time a user expects to be at a target destination exceeds a threshold period of time (e.g., several hours or several days). As such, mapping application 118 can be configured to determine a likelihood (e.g., a confidence score or other quantifiable value) that a given outbound journey is associated with a corresponding return journey (i.e., whether the user is likely to embark on a back and forth trip). When this determined likelihood exceeds a threshold value, then mapping application 118 can be configured to proceed with other system features, including the return destination predictor 132, return journey route generator 134, trip time analyzer 136, and/or return journey notification generator 138.

According to another aspect of the present disclosure, the return destination predictor 132 can be configured to determine a return destination to which a user is predicted to return after traveling to the target destination. In some implementations, the return destination can be predicted to correspond to the initial location for which an outbound journey route is generated. In some implementations, the return destination can be based on a current location associated with a user computing device 110 from which the request for navigational directions is received. In some implementations, the return destination can be determined based on input received from a user computing device 110 from which the request for navigational directions is received. For example, a user can specify a particular return destination via a user interface provided within the mapping application.

In some implementations, the return destination predictor 132 can determine a return destination based on a history of locations visited by a user computing device 110 from which the request for navigational directions is received. In some implementations, a user location history 168 can be provided as part of mapping database 164. For example, user location history 168 can indicate one or more common journey patterns that can help determine a predicted return destination. For instance, a common journey pattern can indicate that when a user leaves a first location (e.g., work) at a particular time of day (e.g., near close of business time) to travel to a second location corresponding to a target destination (e.g., the grocery store), the return destination typically corresponds to a third location (e.g., home). Alternatively, a common journey pattern can indicate that when a user leaves a first location (e.g., home) at a particular time of day (e.g., near start of school time) to travel to a second location corresponding to a target destination (e.g., a child's school), the return destination typically corresponds to the first location (e.g., home).

In some implementations, the return destination predictor 132 can determine a return destination based on a category associated with the target destination. For example, when a user requests navigational directions to a particular point of interest such as "Café ABC," the return destination predictor can determine a category of "restaurant" associated with the "Café ABC" target destination. This category associated with the target destination can be used in analyzing user location history to identify common journey patterns that can help identify a return destination. For example, if user location history indicates that a user often travels from an initial location (e.g., "work") at a particular time of day (e.g., lunchtime) to one or more various target destinations associated with a particular category (e.g., a variety of restaurants), and a user requests navigational directions around lunchtime to Café XYZ, then a return destination of "work" can be predicted.

Once a return destination is specified by a user or otherwise determined by the return destination predictor 132, a return journey route can be generated by return journey route generator 134. More particularly, the return journey route generator 134 can be configured to determine a return journey route from the target destination to the return destination. In some implementations, when the return destination is the same as an initial location, the return journey route can follow some or all of the same road segments as the outbound journey route. However, since traffic heading in one direction along a road segment versus another direction (e.g., an opposite direction) occurs in different lanes along such road segments, the traffic conditions and corresponding travel times associated with a return journey route can be different than an outbound journey route on the same road segment(s). In some implementations, the return journey route can follow some of all of a different set of road segments than the outbound journey route. This can happen, for example, when a return destination is different than the initial location. Even when the return destination is the same as the initial location, different road segments can be traversed when lane patterns, traffic conditions, or other factors result in a different return journey route being faster than a return journey route corresponding to the outbound journey route.

In some implementations, the return journey route generator 134 can determine a plurality of candidate return journey routes between the target destination and the return destination. Each candidate return journey route can include one or more route segments. For each route segment of a candidate return journey route, an estimated drive time for the route can be calculated based on expected traffic conditions (e.g., current traffic conditions and/or historical traffic conditions as determined relative to a return start time). A return start time can be determined as a sum of the estimated outbound journey time plus an estimated destination time. The estimated destination time can correspond to an amount of time a user is predicted to spend at the target destination. In some implementations, the estimated destination time can be determined based on historical data indicative of an average amount of time multiple users spend at the target destination. For example, if the average user spends 20 minutes shopping in Store ABC during a particular day and timeframe, then the destination time can be estimated at 20 minutes. Additionally or alternatively, the estimated destination time can be determined based on historical data indicative of an average amount of time the user spends at the target destination. For example, if the average user spends 10 minutes at his child's school for pickup on a particular day of the week and timeframe, then the destination time can be estimated at 10 minutes.

More particularly, the return journey route generation process can begin by determining that a user will leave the target destination at a return start time equal to the sum of the estimated outbound journey time plus the estimated destination time. The return journey route generator 134 can determine from time period information associated with the given return journey route segment the estimated number of vehicles that are located or expected to be located along the given return journey route segment at the return start time. Using the estimated number of vehicles and a capacity index, the return journey route generator 134 can determine an approximate time of travel along the given return journey route segment.

The return journey route generator 134 can determine the approximate time of travel along the next return journey route segment based on the approximate time of travel of the previous return journey route segment. For example, if a determination is made that it will take approximately two (2) minutes to move along a first return journey route segment and get to a second return journey route segment, the return journey route generator 134 will determine from the time period information associated with the first return journey route segment, the estimated number of vehicles that will be located along the second return journey route segment at two (2) minutes from the return start time. Using the estimated number of vehicles and the capacity index, the return journey route generator 134 can determine an approximate time of travel along the second return journey route segment. The return journey route generator 134 can repeat this process for subsequent route segments until arrival at the return destination.

Once the return journey route generator 134 has determined the estimated travel time for each route segment of a return journey route, the return journey route generator 134 can determine an estimated return journey time for the entire return journey route by determining the sum of the estimated travel times for each of the return journey route segments. In some implementations, the return journey route generator 134 can select a fastest route by comparing the estimated return journey times of a plurality of candidate routes. In some implementations, the return journey route generator 134 can also generate turn-by-turn directions based on the determined return journey route and provide such directions for display to the user computing device 110 (e.g., via display device 120).

According to another aspect of the present disclosure, the trip time analyzer 136 can be configured to compare the estimated outbound journey time to the estimated return journey time. In some implementations, the trip time analyzer 136 can determine when the comparison of the estimated outbound journey time to the estimated return journey time results in a determination that one or more predetermined criteria are met. For example, one of the predetermined criteria can correspond to the estimated return journey time being greater than the estimated outbound journey time. In another example, one of the predetermined criteria can correspond to the estimated return journey time being greater than the estimated outbound journey time plus some predetermined threshold value (e.g., a certain predetermined increment of time or a predetermined percentage of the estimated outbound journey time). In another example, one of the predetermined criteria can correspond to the estimated return journey time being greater than an expected typical trip time.

Aspects of the trip time analyzer 136 can be coupled with aspects of the return journey notification generator 138 such that return journey notifications can be generated and ultimately provided for display on a user computing device 110 (e.g., via display device 120) when various criteria are met as determined by the trip time analyzer 136. For example, a return journey notification can be generated and/or provided (e.g., from a server computing device 150 to the user computing device 110) when comparing the estimated outbound journey time to the estimated return journey time results in a determination that one or more predetermined criteria are met as evaluated by the trip time analyzer 136.

In some implementations, a notification provided by the return journey notification generator 138 can correspond to a warning icon provided on a user interface. In some implementations, a notification provided by the return journey notification generator 138 can correspond to an identification of the estimated return journey time. In some implementations, a notification provided by the return journey notification generator 138 can correspond to a time difference between the estimated outbound journey time and the estimated return journey time. In some implementations, a notification provided by the return journey notification generator 138 can correspond to a warning regarding expected traffic on the return journey route. It should be appreciated that other forms of warnings and/or textual advice can be provided via the return journey notification generator 138 (e.g., "Leave now to avoid traffic on the return journey.")

In some implementations, a notification provided via the return journey notification generator 138 can correspond to a contextual explanation of how one or more of the estimated outbound journey time, the predicted return destination, the estimated destination time, and/or the estimated return journey time is determined. These contextual explanations can also be coupled with user interface features by which a user can change certain estimated assumptions to improve the accuracy of predicted aspects associated with a return journey route. More particularly, user interface features can be provided to receive instructions modifying at least one trip parameter (e.g., a predicted return destination, an estimated destination time, etc.).

In some implementations, a notification provided via the return journey notification generator 138 can include an alternate target destination than the target destination initially associated with a request for navigational directions. For example, if an alternate target destination (e.g., a second grocery store) has an estimated alternate outbound journey time and estimated alternate return journey time that is less than the estimated outbound journey time and the estimated return journey time associated with travel to a first grocery store, then a return journey notification can include a suggestion to select the alternate target destination. Alternate target destinations can be provided for display on a map or other user interface along with information including an estimated outbound journey time and estimated return journey time for the alternate target destination. In some implementations, alternate target destinations can be determined at least in part based on user location history (e.g., user location history 168). By determining an alternate target destination that a given user has actually visited before, the mapping application can enhance the likelihood of determining desirable alternate target destinations for each user.

Server computing device 150 can be a system comprising a single or multiple computing devices that are remotely located relative to user computing device 110. Server computing device 150 can include one or more processors 152 and at least one memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor(s) 152 to cause the server computing device 150 to perform operations.

The server computing device 150 can also include a communications interface 160 that enables communications over one or more networks (e.g., network 180), as well as a mapping application 162 and a mapping database 164. The communications interface 160 of server computing device 150 can include similar features as described relative to communications interface 118 of user computing device 110. Mapping application 162 of server computing device can also include the same features of mapping application 128 depicted relative to user computing device 110, including an outbound journey route generator, return destination predictor, return journey route generator, trip time analyzer, and return journey notification generator.

In some implementations, one or more features of mapping application 128/162 including the outbound journey route generator, return destination predictor, return journey route generator, trip time analyzer, and return journey notification generator can be implemented using one or more machine-learned models. Such machine-learned models can be trained on a large corpus of training data including ground-truth samples that provide a framework for the models improve the accuracy of their inference capabilities. Example machine-learned models can include but are not limited to one or more neural networks (e.g., deep neural networks), support vector machines, decision trees, ensemble models, k-nearest neighbors models, Bayesian networks, or other types of models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks.

Mapping database 164 can include various portions of data that can be accessed by mapping application 162 and utilized in determinations in accordance with the disclosed technology. For example, mapping database can include one or more of traffic information 166, user location history 168, and/or map information 170.

Traffic information 166 can include information for use in determining current traffic conditions and/or historical traffic conditions. Traffic information can be defined relative to different road segments within a map. Each route segment can be associated with one or more geographical locations. A given route between locations can comprise a plurality of route segments. Route segments can be based on stretches of road between intersections, changes in road names, on turn instructions for the particular determined route, or any other useful method. For example, if a route between location A and location C requires a turn at location B, the route consists of two route segments, the segment A-B and the segment B-C.

Traffic information 166 can also include vehicle capacity index data for each road segment. For example, each route segment can be associated with a capacity index representing the capacity of the route segment relative to other route segments. The capacity index can describe how the speed of traffic along a particular route segment varies relative to other route segments depending on the volume of cars on the route segment at any given time. For example, a highway with two lanes can have roughly double the capacity index of a highway with one lane. This can indicate that the addition of a single vehicle on the two-lane highway would impact, for example, by slowing down the speed of traffic roughly half as much as the addition of a single vehicle on the one-lane highway. In another example, assuming that traffic lights are more efficient at moving traffic, an arterial road with a stop sign can have a lower capacity index than an arterial road with a traffic light. Thus, the capacity index is an attribute of the route segment and is independent of the number of cars on the road.

The examples described above are simplified examples demonstrating a linear capacity index assigned to each road. However, it will be understood that in a practical implementation the capacity index is likely to require sophisticated calculations to convert traffic volume to relative speed. In another example, the capacity index can change over time, for example, if the attributes of the route segment changed, such as the number of lanes, or if the timing of traffic signals changed.

The capacity index for a particular route segment can be determined based on observation of the particular route segment over time. For example, the capacity index can be determined by observing the impact on traffic speeds as additional people try to join traffic on a route segment, building a model for each route segment that correlates traffic speed with observed number of users driving on the road. Through such observation the capacity index can be used to predict the impact on traffic speeds for a particular route segment each time an additional vehicle enters or leaves the flow of traffic.

Traffic information 166 can also include vehicle volume data associated with each route segment. For example, vehicle volume data can include a table, database, or other arrangement of data which includes a current estimate of the number of vehicles expected to be on a particular route segment within a specified time period. Time periods can be defined as a time interval, for example, 1 minute or 5 minute periods into the future. The time period data can be updated continuously as the server computing device 150 sends and receives information. The table, capacity index, and vehicle volume data can be used to estimate the amount of time required for a vehicle to travel a road segment at some time in the future. Traffic information can additionally consider construction data, data identifying road closures, weather data or other factors that can affect traffic on one or more road segments.

User location history 168 can include a history of specific locations a user has been and/or routes a user has traveled based on location data (e.g., from geographic position component) and corresponding timestamps that are recorded by a user computing device 110 when authorized by a user to do so. User location history 168 can help determine one or more common journey patterns that can help determine a predicted return destination associated with a request for navigational directions to a specified target destination.

Map information 170 can include map data for use by a user computing device to display one or more maps, routes, turn-by-turn directions, and the like in accordance with aspects of the disclosed technology. For example, map information 170 can include map tiles, where each tile comprises a map image of a particular geographic area. A single tile can cover an entire region such as a state in relatively little detail and another tile can cover just a few streets in high detail. In that regard, a single geographic point can be associated with multiple tiles, and a tile can be selected for transmission based on a desired level of zoom. The map information 170 is not limited to any particular format. For example, the images can comprise street maps, satellite images, or a combination of these, and can be stored as vectors (particularly with respect to street maps) or bitmaps (particularly with respect to satellite images). Map tiles contained within map information 170 can be associated with various geographical locations such that server computing device 150 and/or user computing device 110 are capable of selecting, retrieving, transmitting, or displaying one or more tiles in response to receiving one or more geographical locations.

Mapping application 128/162 and map information 170 can process location information in many different forms, such as such as latitude/longitude positions, street addresses, street intersections, an x-y coordinate with respect to the edges of a map (such as a pixel position when a user clicks on a map), names of buildings and landmarks, and other information in other reference systems that is capable of identifying geographic locations (e.g., lot and block numbers on survey maps). Mapping application 128/162 can further translate locations from one reference system to another. For example, user computing device 110 can employ or access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, 122.083939°. In that regard, it will be understood that exchanging or processing locations expressed in one reference system, such as street addresses, can also be received or processed in other reference systems as well.

Figure 2:
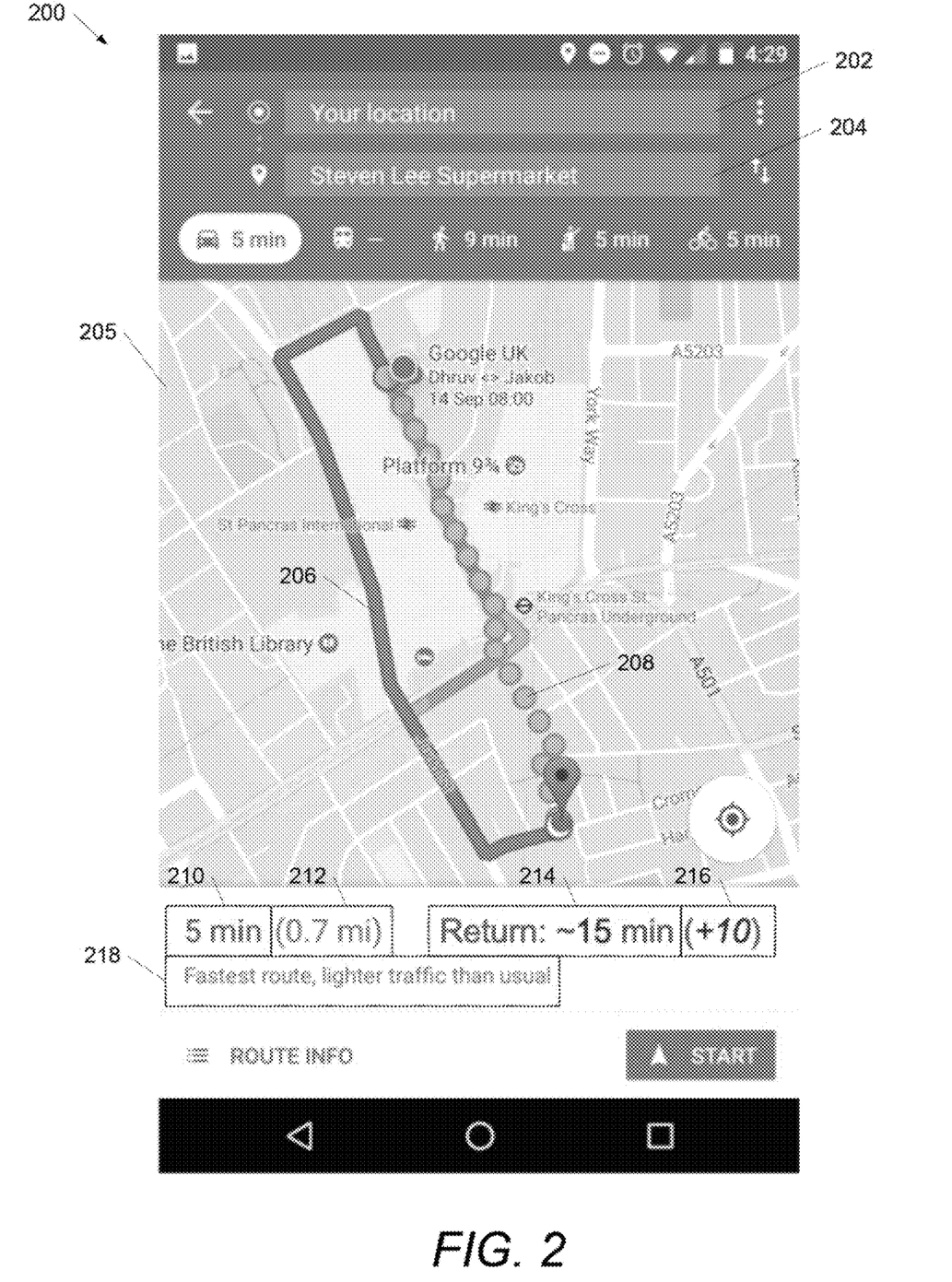
FIG. 2 depicts an example user interface with return journey notifications according to example embodiments of the present disclosure.

Referring now to FIG. 2, an example user interface 200 associated with a mapping application (e.g., mapping application 128/162 of FIG. 1) is depicted. In the example of FIG. 2, user interface 200 includes interactive text entry portions by which a user can specify an initial location 202 (e.g., Your current location) and/or a target destination 204 (e.g., Steven Lee Supermarket). User interface 200 can be configured to depict an outgoing journey route 206 from the initial location to the target destination and a return journey route 208 from the target destination to a return destination (which in this example corresponds to the initial location). User interface 200 can include an estimated outbound journey time 210 and an estimated outbound journey distance 212 associated with the outbound journey route 206. User interface can also include one or more return journey notifications, for example, an estimated return journey time 214 and/or an estimated time difference 216 corresponding to a delay between the estimated outbound journey time 210 and estimated return journey time 214. It should be appreciated that the user interface 200 of FIG. 2 is provided as an example only. Alternative user interfaces may not necessarily include a map and/or may include additional or alternative return journey notifications than those depicted in FIG. 2.

Figure 3:
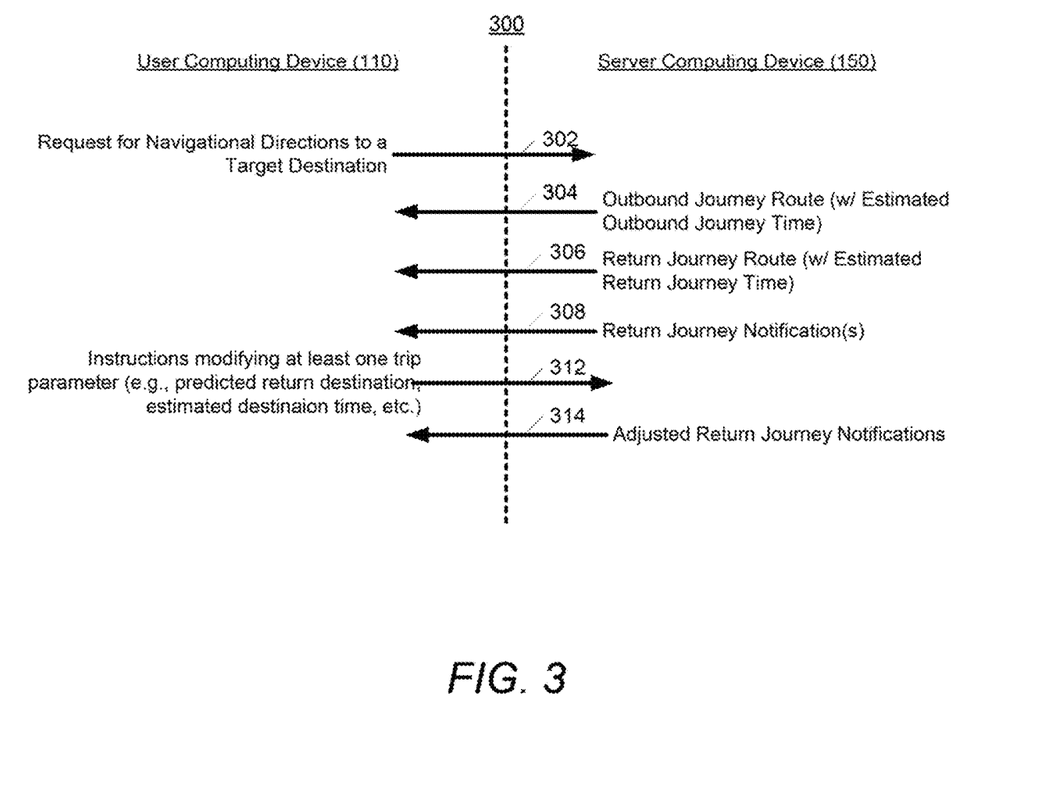
FIG. 3 depicts an example communication schematic for implementing return journey notifications according to example embodiments of the present disclosure.

Referring now to FIG. 3, a communication schematic 300 for providing return journey notifications according to example embodiments of the present disclosure is depicted. Communications schematic 300 includes different signaling that can occur between a user computing device 110 and a server computing device 150 to implement return journey mapping communication. For example, signal 302 communicated from user computing device 110 to server computing device 150 can include a request for navigational directions to a target destination. Signal 302 can include at least a target destination and optionally an initial location when the initial location differs from a current location of user computing device 110.

Signal 304 communicated from server computing device 150 to user computing device 110 can include an outbound journey route determined from an initial location to the target destination. Signal 304 can include an estimated outbound journey time associated with the outbound journey route. Signal 304 can also include a map and/or turn-by-turn directions associated with the outbound journey route.

Signal 306 communicated from server computing device 150 to user computing device 110 can include a return journey route determined from the target destination to a return destination. Signal 306 can include an estimated return journey time associated with the return journey route. Signal 306 can also include a map and/or turn-by-turn directions associated with the return journey route.

Figure 5:
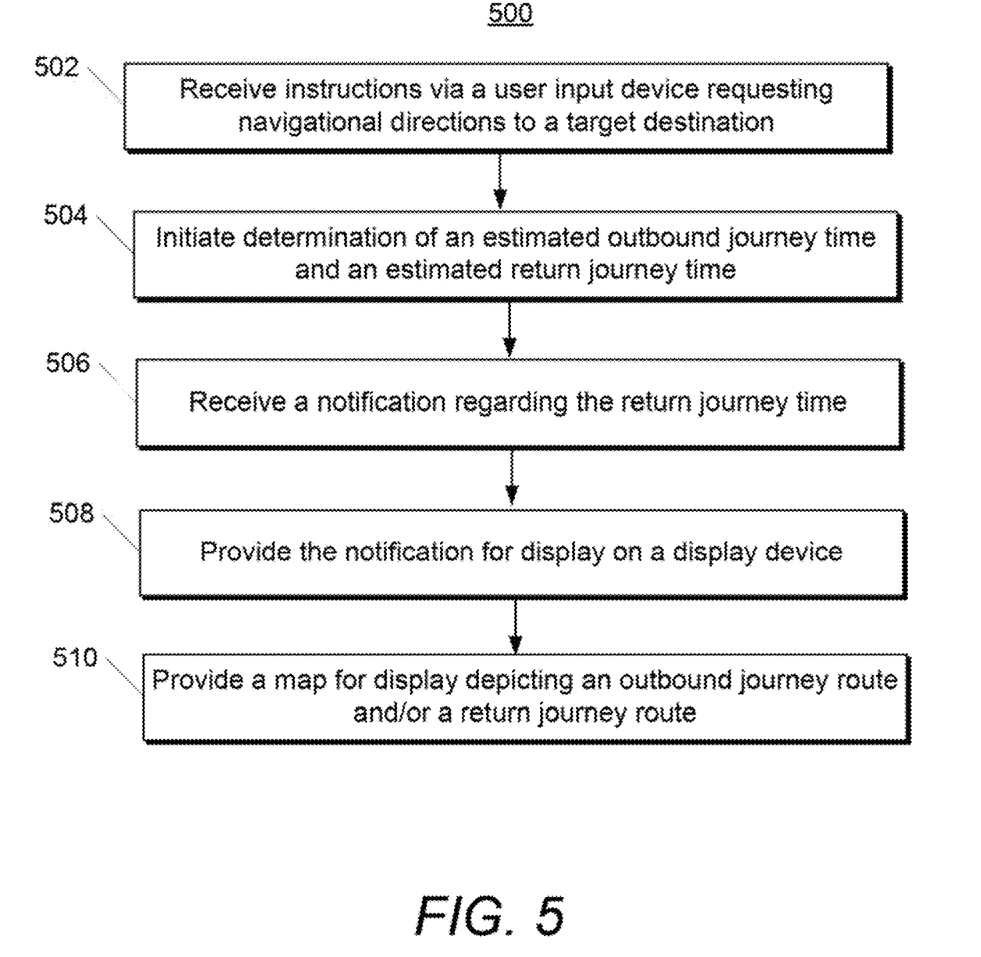
FIG. 5 depicts a flowchart of a second example method according to example embodiments of the present disclosure.

Signal 308 communicated from server computing device 150 to user computing device 110 can include one or more return journey notifications such as described herein. Although signals 304, 306, and 308 are illustrated in FIG. 5 as separate signals, it should be appreciated that the outbound journey, return journey and associated data including return journey notification(s) can be communicated in a single transmission from the server computing device 150 to user computing device 110.

In some implementations, the one or more return journey notifications communicated via signal 308 can include a contextual explanation of how one or more of the estimated outbound journey time, the predicted return destination, the estimated destination time, and/or the estimated return journey time is determined. These contextual explanations can also be coupled with user interface features by which a user can change certain estimated assumptions to improve the accuracy of predicted aspects associated with a return journey route. More particularly, user interface features can be provided to receive instructions modifying at least one trip parameter (e.g., a predicted return destination, an estimated destination time, etc.). These instructions can then be provided via signal 312 from user computing device 110 back to server computing device 150. In response, adjusted return journey notifications (and optional adjusted outbound journey route and/or return journey route) can be provided via signal 314 from server computing device 150 to user computing device 110.

Figure 4:
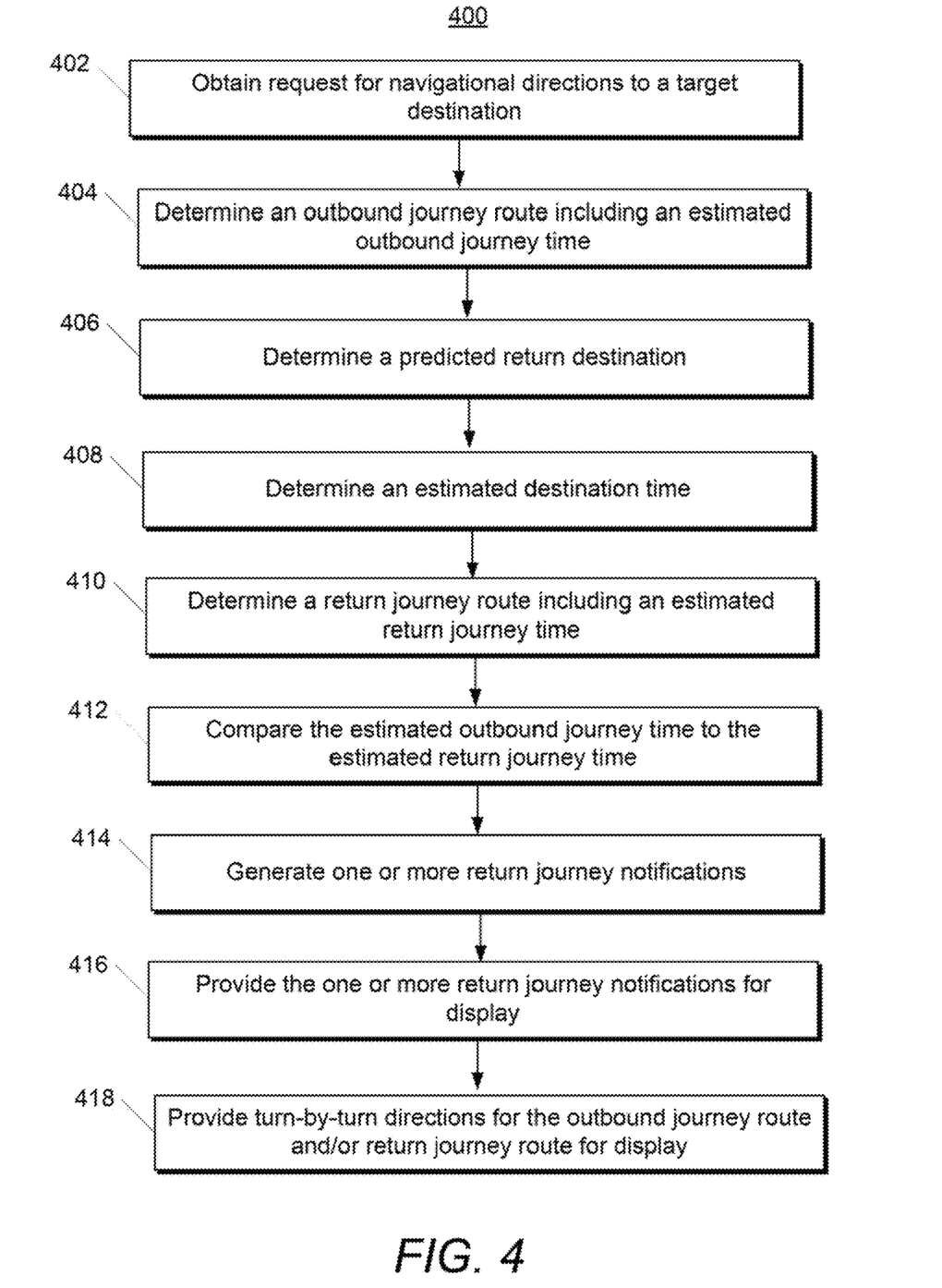
FIG. 4 depicts a flowchart of a first example method according to example embodiments of the present disclosure.

FIG. 4 depicts a flowchart of a first example method 400 according to example embodiments of the present disclosure.

At 402, one or more computing devices (e.g., one or more user computing devices and/or one or more server computing devices) can obtain a request for navigational directions to a target destination. In some implementations, the target destination is provided by instructions received as user input (e.g., to a user computing device).

At 404, the one or more computing devices can determine an outbound journey route from an initial location to the target destination, wherein the outbound journey route includes an estimated outbound journey time. In some implementations, determining the estimated outbound journey time at 404 is based at least in part on one or more of current traffic conditions or historical traffic conditions.

At 406, the one or more computing devices can determine a predicted return destination. In some implementations, determining the return destination at 406 can be determined based on input received from a user computing device from which the request for navigational directions is received at 402. In some implementations, determining the return destination at 406 can be based on a current location associated with a user computing device from which the request for navigational directions is received at 402. In some implementations, determining the return destination at 406 can be based on a history of previously visited locations associated with a user computing device from which the request for navigational directions is received.

At 408, the one or more computing devices can determine an estimated destination time indicative of an estimated amount of time a user will spend at the target destination. In some implementations, the estimated destination time determined at 408 can be based an average amount of time multiple users spend at the target destination. In some implementations, the estimated destination time determined at 408 can be based on an average amount of time the user spends at the target destination. The estimated destination time determined at 408 as well as the estimated outbound journey time determined at 404 can be used together to help determine a return start time for determining an estimated return journey time.

More particularly, at 410, the one or more computing devices can determine a return journey route from the target destination to a return destination, wherein the return journey route includes an estimated return journey time. In some implementations, determining the estimated return journey time at 410 is based at least in part on one or more of current traffic conditions or historical traffic conditions.

At 412, the one or more computing devices can compare the estimated outbound journey time to the estimated return journey time. At 414, the one or more computing devices can generate a notification regarding the return journey route when comparing the estimated outbound journey time to the estimated return journey time at 412 results in identification of one or more predetermined criteria. In some implementations, the notification generated at 414 can include an identification of the estimated return journey time. In some implementations, the notification generated at 414 can include a time difference between the estimated outbound journey time and the estimated return journey time. In some implementations, the notification generated at 414 can include a warning regarding expected traffic on the return journey route. In some implementations, the notification generated at 414 can include a contextual explanation of how one or more of the estimated outbound journey time, the estimated destination time, or the estimated return journey time is determined. In some implementations, the notification generated at 414 can include an alternate target destination. In such instance, method 400 can also include determining an alternate target destination having an estimated alternate outbound journey time and estimated alternate return journey time that is less than the estimated outbound journey time determined at 404 and the estimated return journey time determined at 410.

At 416, the one or more computing devices can provide for display, the one or more return journey notifications generated at 414. For example, the one or more return journey notifications can be provided for display on a display device associated with a user computing device.

At 418, the one or more computing devices can provide for display, a map depicting the outbound journey route and the return journey route, optionally including turn-by-turn directions for the outbound journey route and the return journey route. In some implementations, the return journey notifications provided for display at 416 can be a part of the map and/or directions provided for display at 418.

FIG. 5 depicts a flowchart of a second example method 500 according to example embodiments of the present disclosure. In some implementations, method 500 is implemented by one or more processors of a user computing device such as user computing device 110 of FIG. 1.

At 502, a user computing device can receive a request for navigational directions to a target destination. In some implementations, the request for navigational directions received at 502 can be provided as instructions via a user input device (e.g., a touchscreen, a keyboard, etc.)

At 504, the user computing device can initiate determination of an estimated outbound journey time to travel from an initial location to the target destination and an estimated return journey time to travel from the target destination to a return destination. In some implementations, a user computing device initiates determination of such routes, but the actual determination is implemented by a server computing device, one or more aspects of which can be returned to the user computing device. In some implementations, the estimated outbound journey time and the estimated return journey time can be determined at least in part from one or more of current traffic conditions or historical traffic conditions.

At 506, the user computing device can receive a notification regarding the return journey time when a comparison of the estimated outbound journey time to the estimated return journey time results in a determination that one or more predetermined criteria are met.

At 508, the user computing device can provide the notification received at 506 for display on a display device associated with the user computing device. At 510, a map depicting the outbound journey route and/or return journey route can also be provided for display. In some implementations, the notification regarding the return journey time provided for display at 508 can be part of the map provided for display at 510.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 3-5 respectively depict steps performed in a particular order for purposes of illustration and discussion, the methods of the present disclosure are not limited to the particularly illustrated order or arrangement. The various steps of the methods/configurations 300, 400, and 500 can be omitted, rearranged, combined, and/or adapted in various ways without deviating from the scope of the present disclosure.

What is claimed is:

1. A computer-implemented method, comprising:
    obtaining, by one or more computing devices, a request for navigational directions to a target destination;
    determining, by the one or more computing devices, an outbound journey route from an initial location to the target destination, wherein the outbound journey route comprises an estimated outbound journey time;
    determining, by the one or more computing devices, a return journey route based at least in part on one or more operations performed by one or more machine-learned models, wherein the return journey route comprises a route from the target destination to a return destination, and wherein the return journey route comprises an estimated return journey time;
    comparing, by the one or more computing devices, the estimated outbound journey time to the estimated return journey time; and
    generating, by the one or more computing devices, a notification regarding the return journey route when comparing the estimated outbound journey time to the estimated return journey time results in a determination that one or more predetermined criteria are met, wherein the notification regarding the return journey route comprises a time difference between the estimated outbound journey time and the estimated return journey time.

2. The computer-implemented method of claim 1, further comprising determining, by the one or more computing devices, an estimated destination time indicative of an estimated amount of time a user will spend at the target destination, wherein a return start time for determining the estimated return journey time is based on the outbound journey time and the estimated destination time.

3. The computer-implemented method of claim 1, wherein determining the estimated outbound journey time and the estimated return journey time is based at least in part on one or more of current traffic conditions or historical traffic conditions.

4. The computer-implemented method of claim 1, wherein the notification regarding the return journey route comprises an identification of the estimated return journey time.

5. The computer-implemented method of claim 1, wherein the notification regarding the return journey route comprises a warning regarding expected traffic on the return journey route.

6. The computer-implemented method of claim 1, wherein the notification regarding the return journey route comprises a contextual explanation of how one or more of the estimated outbound journey time, an estimated destination time, or the estimated return journey time is determined.

7. The computer-implemented method of claim 1, further comprising determining, by the one or more computing devices, an alternate target destination having an estimated alternate outbound journey time and estimated alternate return journey time that is less than the estimated outbound journey time and the estimated return journey time.

8. The computer-implemented method of claim 1, further comprising determining, by the one or more computing devices, the return destination.

9. The computer-implemented method of claim 8, wherein determining the return destination is based on a current location associated with a user computing device from which the request for navigational directions is received.

10. The computer-implemented method of claim 8, wherein determining the return destination is based on a history of previously visited locations associated with a user computing device from which the request for navigational directions is received.

11. The computer-implemented method of claim 1, further comprising providing for display, by the one or more computing devices, a map depicting the outbound journey route and the return journey route.

12. The computer-implemented method of claim 1, wherein determining, by the one or more computing devices, the return journey route from the target destination to the return destination occurs when a determined likelihood that the outbound journey route is associated with a corresponding return journey is greater than a threshold value.

13. A user computing device, comprising:
a display device;
one or more processors;
at least one tangible, non-transitory computer-readable medium that stores instructions that, when executed by the one or more processors, cause the user computing device to perform operations, the operations comprising:
receiving a request for navigational directions to a target destination;
determining an outbound journey route from an initial location to the target destination, wherein the outbound journey route comprises an estimated outbound journey time;
determining a return journey route based at least in part on one or more operations performed by one or more machine-learned models, wherein the return journey route comprises a route from the target destination to a return destination, and wherein the return journey route comprises an estimated return journey time;
receiving a notification regarding the estimated return journey route when a comparison of the estimated outbound journey time to the estimated return journey time results in a determination that one or more predetermined criteria are met, wherein the notification regarding the return journey route comprises a time difference between the estimated outbound journey time and the estimated return journey time; and
providing the notification for display on the display device.

14. The user computing device of claim 13, wherein the notification regarding the estimated return journey time comprises an identification of the estimated return journey time.

15. The user computing device of claim 13, wherein the notification regarding the estimated return journey time comprises a warning regarding expected traffic on the return journey route.

16. The user computing device of claim 13, wherein the notification regarding the estimated return journey time comprises a contextual explanation of how one or more of the estimated outbound journey time, an estimated destination time, or the estimated return journey time is determined.

17. The user computing device of claim 13, wherein the operations further comprise providing for display a map depicting an outbound journey route associated with the estimated outbound journey time and a return journey route associated with the estimated return journey time.

18. One or more tangible, non-transitory computer-readable media storing computer executable instructions that when executed by one or more processors cause the one or more processors to perform operations, the operations comprising:
obtaining a request for navigational directions to a target destination;
determining an outbound journey route from an initial location to the target destination, wherein the outbound journey route comprises an estimated outbound journey time;
determining a return journey route based at least in part on one or more operations performed by one or more machine-learned models, wherein the return journey route comprises a route from the target destination to a return destination, and wherein the return journey route comprises an estimated return journey time;
comparing the estimated outbound journey time to the estimated return journey time; and
generating a notification regarding the return journey route when comparing the estimated outbound journey time to the estimated return journey time results in a determination that one or more predetermined criteria are met, wherein the notification regarding the return journey route comprises a time difference between the estimated outbound journey time and the estimated return journey time.

19. The one or more tangible, non-transitory computer-readable media of claim 18, wherein the estimated destination time is based on one or more of an average amount of time multiple users spend at the target destination or an average amount of time the user spends at the target destination.

20. The one or more tangible, non-transitory computer-readable media of claim 18, wherein the notification regarding the estimated return journey time comprises an identification of the estimated return journey time.

* * * * *